(No Model.)
J. W. COOK.
CULTIVATOR.
No. 290,539. Patented Dec. 18, 1883.
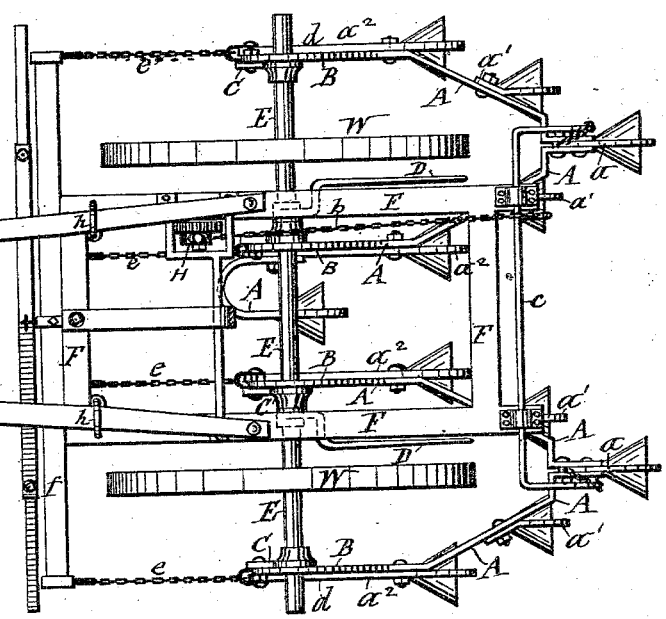
Witnesses—
Wm. B. Raymond
C. Bendixon
Inventor—
James W. Cook
per Dodd, Lassiter
his attorney

UNITED STATES PATENT OFFICE.

JAMES W. COOK, OF MORAVIA, NEW YORK, ASSIGNOR OF ONE-HALF TO WILLIAM S. PARKER, OF SAME PLACE.

CULTIVATOR.

SPECIFICATION forming part of Letters Patent No. 290,539, dated December 18, 1883.

Application filed April 9, 1883. (No model.)

*To all whom it may concern:*

Be it known that I, JAMES W. COOK, of Moravia, in the county of Cayuga, in the State of New York, have invented new and useful Improvements in Cultivators, of which the following, taken in connection with the accompanying drawings, is a full, clear, and exact description.

This invention consists, essentially, in the combination, with the cultivator-sulky, of two V-shaped cultivator-frames, each extended around the rear portion of one of the wheels and along opposite sides thereof, and terminating at the axle parallel with the line of draft, thereby producing a machine capable of cultivating at one operation two full spaces between three rows of plants.

The invention also consists in novel means of adjustably connecting the aforesaid frames with the axles of the sulky.

It also consists of a duplex tongue separably united at its free end, and adapted to be used in the form of thills to receive a horse between them, and one at each side thereof, so that the machine may be operated either by two or three horses, all as hereinafter more fully described, and specifically set forth in the claims.

In the annexed drawings, Figure 1 is a side elevation of my improved cultivator. Fig. 2 is a plan view of the same with the driver's seat broken away. Fig. 3 is an isometric detail view of the device for elevating the sulky-frame above the axle; and Fig. 4 is a detached view of the forward or free end of the duplex tongue.

Similar letters of reference indicate corresponding parts.

F represents the sulky-frame, which I mount loosely on the axle E of the carrying-wheels W, so as to allow said frame to be elevated sufficiently to pass over tall corn or other plants without injuring the same, the raising of said frame being effected by means of a lever, D, pivoted on the axle at opposite sides of the frame F, and formed with a lateral offset, $m$, which extends under the said frame. By raising the free end of the lever D the offset $m$ thereof is caused to pry up the frame F, as illustrated in Fig. 3 of the drawings. A pendent loop, $l$, attached to the frame F and extended around the axle, forms a vertical guide for preventing longitudinal movement of the frame.

A A represent two iron frames, each constructed of two bars, joined at one end back of and in line with the wheel, and extended divergently or V-shaped along opposite sides of the wheel, and terminating at the axle parallel with the line of draft, the end portions being curved vertically to form two bails or yokes, B B, which pass over the top of the axle E at opposite sides of the carrying-wheels W, and are connected with the end of an arm, C, fastened on the axle, said connection being made adjustable by a longitudinal slot, $s$, in the arm, through which slot the attaching-bolt $t$ passes, and which allows the connection to be made at a greater or less distance from the axle E, and thus lowers and raises the forward end of the frames A correspondingly, the elevation of the rear end of said frames being adjusted by means of a lever, H, pivoted on the frame F, and provided with the usual dog for engaging a fixed segmental rack, by which the lever is retained in its desired position. A chain, $b$, is extended from the lower free end of the aforesaid lever to one of the arms of a cranked shaft, $c$, extended across the rear end of the frame F and supported in suitable bearings on said frame, and another chain, $b'$, is connected at one end to another arm of the shaft $c$, and at the opposite end it is connected with the rear end of the frame A. By swinging the lever H backward or forward, the rear end of the frame A is raised or lowered, as may be desired.

$a$, $a'$, and $a^2$ are anchor-shaped standards secured to the frames A A, and provided at their feet with suitable cultivator-teeth. The standard $a$, I prefer to fasten in its position by clamping its upper end between the two rear ends of the bars of which the frames A are formed, the bolts which fasten said bars together passing through holes in the standard $a$. The next set of standards, $a'$, are to be bolted or otherwise fastened to the frames A about midway the divergent portions thereof, and the forward standards, $a^2$, I bolt to the side of the frame A at its junction with the yoke B, and form its upper end with a horizontal extension, $d$, which reaches across the foot of the yoke and is secured to the forward end of said yoke, where are also attached the draft-chains $e$, which are connected with a draft-bar, $f$, secured across the front end of the frame F.

It will be observed that by the arrangement of the V-shaped frames A A, extended along the two sides of each of the wheels W, and each provided with a set of cultivator-teeth at opposite sides of said wheels, I double the capacity of the cultivators, the two sets of cultivator-teeth working the two spaces between three rows of plants.

T T represent a duplex tongue, consisting of two poles pivoted to the two side rails of the frame F some distance from the forward end thereof, and clamped in their position by hooks $h$, detachably connected to the forward end of the aforesaid side rails, the free end of said two poles being separably united by an iron band, $i$, slipped over them, or by any other suitable device.

When two horses are to be employed for drawing the cultivator, the two poles are to be united as aforesaid, and used in the same manner as a single pole or tongue. When three horses are to be hitched to the cultivator, the free ends of the two poles are to be separated and secured a sufficient distance apart to receive a horse between them by shifting or turning the hooks $h$ and refastening them. The other horses are to be hitched at the outer side of the two poles.

Having described my invention, what I claim as new, and desire to secure by Letters Patent, is—

1. In combination with the sulky, two cultivator-frames, each formed of two bars joined at one end back of the wheel and extended divergently along opposite sides of the wheel, and terminating with supports on the axle, substantially as set forth.

2. In combination with a sulky, two V-shaped cultivator-frames, each extended around the rear portion of one of the wheels and along opposite sides thereof, and terminating parallel with the line of draft at the axle, and supported by the axle, substantially as set forth and shown.

3. In combination with a sulky, two V-shaped cultivator-frames, each extended around the rear and along opposite sides of one of the wheels, and terminating with yokes extended over the axle and supported thereon, substantially as described and shown.

4. In combination with the sulky, the frame A, composed of two bars connected at one end and disposed divergently at opposite sides of the wheel W, the standard $a$, clamped between the connected ends of said bars, standards $a'$ and $a^2$, connected to the bars at different points of their length, and yokes supporting the forward ends of the said bars from the axle of the sulky, substantially as shown and described.

5. In combination with the sulky, the frames A, provided at their free end with the yokes B, extended over the axle, and the arm C, fixed to the axle and having its free end connected with the yoke B, substantially as set forth and shown.

In testimony whereof I have hereunto signed my name and affixed my seal, in the presence of two attesting witnesses, at Syracuse, in the county of Onondaga, in the State of New York, this 14th day of March, 1883.

JAMES W. COOK. [L. S.]

Witnesses:
C. H. DUELL,
FRED. H. GIBBS.